March 4, 1952     L. BIRKIGT     2,587,812
SPINNING SPINDLE MECHANISMS, IN PARTICULAR TO THOSE
DRIVEN BY MEANS OF A WORM AND WORM WHEEL
Filed Jan. 22, 1951     2 SHEETS—SHEET 1

INVENTOR
LOUIS BIRKIGT,
BY
ATTORNEY

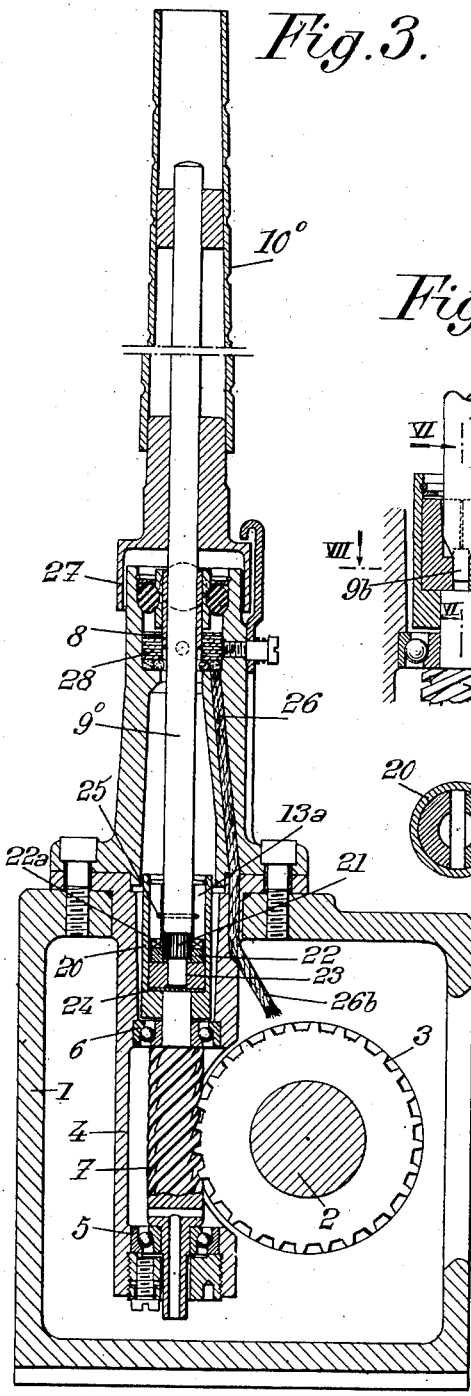
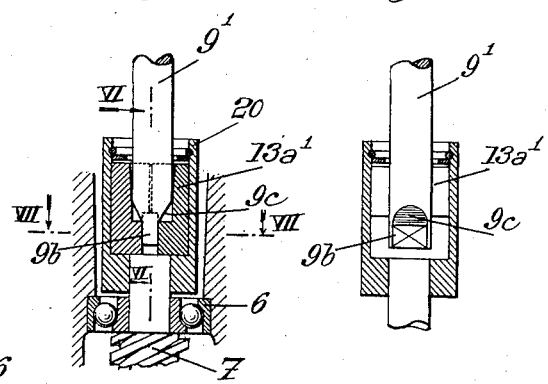
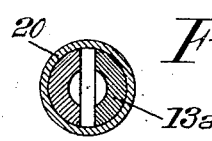
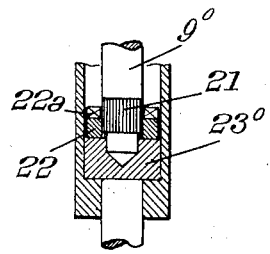
INVENTOR
LOUIS BIRKIGT,
BY Robert H. Larson
ATTORNEY Patented Mar. 4, 1952

2,587,812

UNITED STATES PATENT OFFICE 2,587,812

SPINNING SPINDLE MECHANISMS, IN PARTICULAR TO THOSE DRIVEN BY MEANS OF A WORM AND WORM WHEEL

Louis Birkigt, Versoix, pres Geneva, Switzerland, assignor to "Hispano-Suiza" (Suisse) S. A., Geneva, Switzerland, a society of Switzerland Application January 22, 1951, Serial No. 207,168
In Luxemburg January 31, 1950

10 Claims. (Cl. 57—102)

The present invention relates to spinning spindle mechanisms of the worm and worm wheel drive type.

Its chief object is to provide a mechanism of this kind which is better adapted to meet the requirements of practice.

It consists chiefly in interposing between a driving element actuated by the worm and a driven element coupled with the bobbin a centrifugal clutch the centrifugal elements of which participate in the rotation movement of said driven element, whereby stopping of this element causes said clutch to be disengaged, means being provided, in order to start said bobbin, for gradually imparting a rotary movement to said driven element so as to bring the centrifugal clutch into operation.

Other features of the invention will become apparent in the course of the following detailed description of some embodiments thereof with respect to the accompanying drawings, given merely by way of example, and in which:

Fig. 3 is a view similar to Fig. 1 of another embodiment.

Fig. 4 is an axial section of a detail modification.

Fig. 5 is an axial vertical section of a coupling device for use in connection with a spinning mechanism according to my invention;

Fig. 6 is an axial vertical section on the line VI—VI of Fig. 5; and

Fig. 7 is a transverse section on the line VII—VII of Fig. 5.

Figure 1:
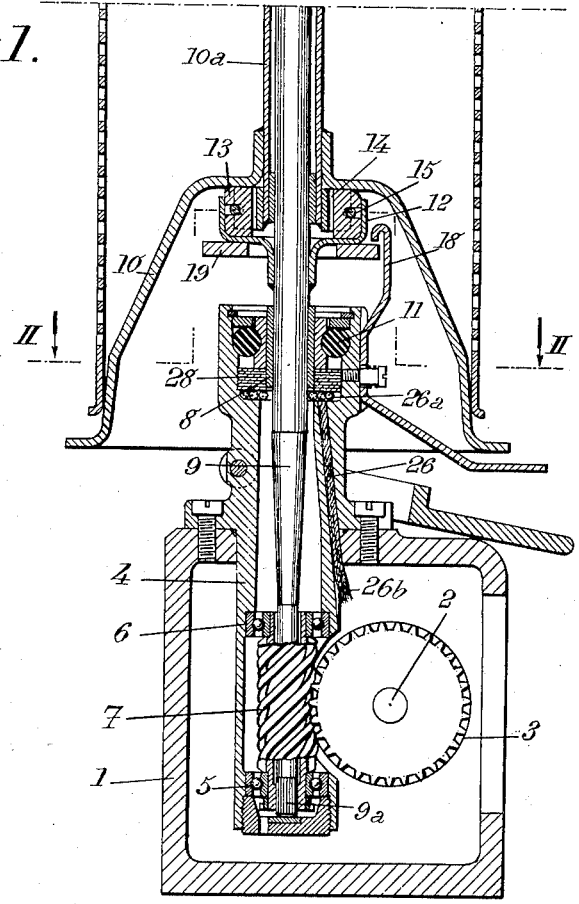
Fig. 1 is a vertical section of a spinning spindle mechanism according to my invention.

The mechanism includes a casing 1, adapted to be fixed to a suitable support and in which is journalled a horizontal shaft 2 carrying a worm wheel 3.

A tubular piece 4 is fixed vertically in casing 1 to support, through a lower bearing 5 and an upper bearing 6 (for instance ball bearings), a sleeve which carries the teeth of worm 7 which is intended to mesh with worm wheel 3.

The upper part of tubular piece 4, which extends above casing 1, carries a bearing 8 for guiding the bobbin 10, the outer cage of said bearing being housed in a bore provided for this purpose in said tubular piece, with a toroidal rubber ring, interposed between said cage and said piece.

According to my invention, I interpose, between a driving element actuated by worm 7 and a driven element coupled in rotation with bobbin 10, a centrifugal clutch the centrifugal elements of which participate in the movement of rotation of the driven element. Furthermore, means are provided for gradually rotating said driven element, in order to start bobbin 10 by bringing the clutch into operation.

Owing to this arrangement, when bobbin 10 is slowed down by braking, the centrifugal clutch is brought out of action and prevents a detrimental heating of the coupling means between the driving element, which keeps rotating at normal speed, and the driven element, which has been slowed down or stopped.

If, in these conditions, it is desired to have bobbin 10 wholly disengaged from the driving shaft, the means for subsequently restarting the bobbin must be brought out of action by the braking or slowing down operation and must work only when the bobbin is no longer braked.

If, on the contrary, a partial disconnection is found to be sufficient, the restarting means may remain constantly in operation.

In the following description, it will be supposed that these restarting means operate by friction.

Before describing specific embodiments of my invention, it is pointed out that the position of the centrifugal clutch may undergo some variations provided it is inserted so to speak in series in the transmission between worm 7 and bobbin 10.

In particular is may be interposed either between spindle 9 and bobbin 10 (which then constitute the "driving" and "driven" elements respectively) or between a part rigid with worm 7 (which then constitutes the driving element) and spindle 9 (which then constitutes the driven element).

Figure 2:
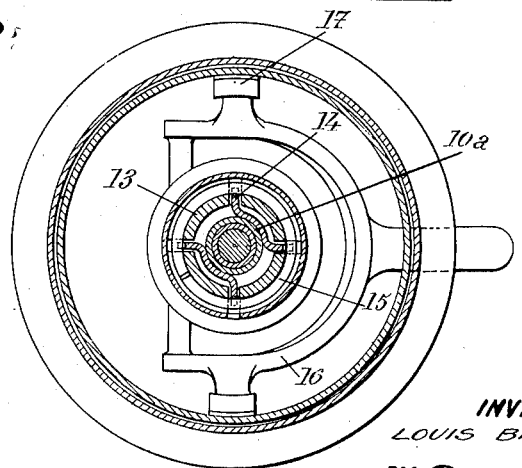
Fig. 2 is a transverse section on the line II—II of Fig. 1.

I will first describe an embodiment, illustrated by Figs. 1 and 2, in which bobbin 10 is wholly disengaged from the driving means and the centrifugal clutch is interposed between spindle 9 and the bobbin.

According to this embodiment, spindle 9 is coupled with the bottom of the sleeve which carries worm 7 through ribs 9a which make it possible to remove spindle 9 by pulling it upwardly.

Spindle 9 carries, rigid therewith, a cup-shaped part 12 against the bottom and lateral wall of which can cooperate radially movable masses 13, preferably made of bronze, and the number of which is for instance four.

In order to have these centrifugal elements 13 driven in rotation by bobbin 10, I make use of members 14 rigid with the hub 10a of said bobbin and extending radially between these centrifugal masses.

Masses 13 are subjected to the action of return means, constituted by a spring ring 15 urging the masses toward their retracted or inner position, said ring being housed in grooves and notches provided for this purpose in masses 13 and members 14 respectively.

A braking device is constituted by a pivoting fork 16 carrying braking shoes 17 so as simultaneously to slow down bobbin 10 and to lift it with respect to spindle 9.

Preferably, any undue lifting of spindle 9 is prevented by a retractable hook 18 cooperating with a ring 19 rigid with cup-shaped part 12.

Such a system works in the following manner:

When bobbin 10 is braked and lifted by means of shoes 17, the rotation of masses 13 is slowed down and these masses are gradually retracted by the action of spring ring 15. Furthermore these masses are lifted by ring 15, itself moved upwardly by members 14 through the notches of which said ring extends. As masses 13 are thus moved away from the side and bottom walls of cup-shaped part 12, the rotation movement of spindle 9, rigid with said part 12, ceases to be transmitted to bobbin 10, which stops if the braking action is exerted for a sufficient time. When it is desired to restart this bobbin, it suffices to move fork 16 in the opposed direction, whereby, first, centrifugal masses 13 come into contact through their under edges with the bottom of cup-shaped part 12 and then shoes 17 are moved away from the inner wall of bobbin 10. The friction which is produced between the bottom of cup-shaped part 12 (which rotates together with spindle 9) and the lower edges of masses 13 gradually causes said masses to rotate and to expand radially against the action of ring 15 until they come into contact with the side wall of part 12, which corresponds to engagement of the centrifugal clutch between spindle 9 and bobbin 10.

Fig. 3 shows another embodiment which corresponds to the case in which there is always a torque transmitted to bobbin 10⁰. In this embodiment, the centrifugal clutch is interposed, not between the spindle and the bobbin, but between the spindle and a part rotating together with worm 7.

According to this embodiment, the sleeve which carries worm 7 carries a tubular extension 20 extending above the upper bearing 6 and against the inner wall of which centrifugal masses 13a can bear.

These masses are driven in rotation by spindle 9⁰. For this purpose, the lower end of this spindle is coupled through longitudinal ribs 21 with an annular piece 22 provided, along its upper edge, with lugs 22a extending in the intervals between masses 13a.

The lower end of spindle 9⁰ is guided in a smooth bearing 23 and rests through its rounded end, on a bearing plate 24.

Masses 13a are subjected to the action of an expansible spring ring 25 which urges said masses outwardly.

This system works in the following manner:

When bobbin 10⁰ is braked (for instance by the action of a conventional brake acting upon drum 27 and which imparts no lifting movement to said bobbin), spindle 9⁰ is slowed down and the pressure with which masses 13a are applied against the inner wall of sleeve 30 is reduced. When bobbin 10⁰ and spindle 9⁰ are stopped, the pressure that remains (due to the action of spring 25 on masses 13a) constitutes the means for creating a friction which serves to restart spindle 9⁰ and bobbin 10⁰ when they are no longer braked. Gradual increase of the speed of revolution of the spindle then increases the pressure with which masses 13a are applied and the centrifugal clutch is reengaged.

Fig. 4 shows a detail modification of this construction, according to which bearing 23⁰ serves to support the weight of spindle 9⁰.

Figs. 5 to 7 show a portion of a spindle mechanism according to my invention.

According to this construction, means (not shown) are provided for simultaneously braking bobbin 10⁰ and lifting spindle 9¹ (said means being for instance of the same kind as shown by Figs. 1 and 2). Instead of subjecting the centrifugal masses 13a¹ (the number of which is two) to the action of a spring tending to move them away from each other, I make use, for this purpose, of the downward movement of spindle 9¹, the lower end of which forms a kind of screw-driver 9b for transmitting the rotary movement of the spindle to the masses, a bevelled portion 9c being provided above this screw-driver end so as to act as a wedge to move the centrifugal masses away from each other when the spindle is allowed to move down.

With this construction, the pressure with which the centrifugal masses are applied against the inner wall of sleeve 20 drops below a substantial value when bobbin 10⁰ is braked and spindle 9¹ is lifted, the clutch being engaged only when the weight of the spindle and the bobbin drives the masses away from each other.

With any of the constructions above described, the bobbin can easily be stopped or restarted, and this temporary stopping may last for any desired time without risk of heating.

Preferably, lubrication of at least one spindle guiding bearing, for instance the upper one, 8, is obtained by means of a wick 26, advantageously housed in a channel provided in tubular piece 4, the upper end of this wick being wound around said spindle, close to the zone to be lubricated, under a felt or similar ring 28, and the lower end 26b extending into casing 1 so as to hang above worm wheel 3, where it is sprinkled with oil projected from said worm wheel.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A spinning spindle mechanism which comprises, in combination, a frame, a bobbin rotatably mounted on said frame, a driving shaft journalled in said frame, a worm wheel secured to said shaft, a worm in mesh with said worm wheel journalled in said frame, a centrifugal frictional clutch including a driving part, a driven part and centrifugal force responsive control means for interconnecting said two parts, means for coupling said driving part in rotation with said worm, means for coupling said driven part in rotation with said bobbin, means for positively transmitting rotary motion between said bobbin and said centrifugal control means, and restarting means for urging said centrifugal means outwardly to start said driven part into rotation.

2. A spinning spindle mechanism which comprises, in combination, a frame, a bobbin rotatably mounted on said frame, a driving shaft journalled in said frame, a worm wheel secured to said shaft, a worm in mesh with said worm wheel journalled in said frame, a centrifugal frictional clutch including a driving part, a driven part and centrifugal force responsive control means for interconnecting said two parts, means for coupling said driving part in rotation with said worm, means for coupling said driven part in rotation with said bobbin, means for positively transmitting the rotary motion between said bobbin and said centrifugal control means, and restarting means for transmitting a portion of the torque of said driving part to said driven part for starting said driven part into rotation.

3. A spinning spindle mechanism which comprises, in combination, a frame, a bobbin rotatably mounted on said frame, a driving shaft journalled in said frame, a worm wheel secured to said shaft, a worm in mesh with said worm wheel journalled in said frame, a centrifugal frictional clutch including a driving part, a driven part and centrifugal force responsive control means for interconnecting said two parts, means for coupling said driving part in rotation with said worm, means for coupling said driven part in rotation with said bobbin, means for positively transmitting rotary motion between said bobbin and said centrifugal control means, and restarting means for transmitting a portion of the torque of said driving part to said driven part for starting said driven part into rotation, means for braking said bobbin, and means operatively connected with said braking means for disengaging said slipping clutch means when said braking means are in action.

4. A spinning spindle mechanism which comprises, in combination, a frame, a bobbin rotatably mounted on said frame, a driving shaft journalled in said frame, a worm wheel secured to said shaft, a worm in mesh with said worm wheel journalled in said frame, a centrifugal frictional clutch including a driving part, a driven part and centrifugal force responsive control means for interconnecting said two parts, means for coupling said driving part in rotation with said worm, means for coupling said driven part in rotation with said bobbin, means for positively transmitting rotary motion between said bobbin and said centrifugal control means, and restarting means constantly in action for urging said centrifugal means outwardly to start said driven part into rotation.

5. A spinning spindle mechanism which comprises, in combination, a frame, a spindle rotatably mounted on said frame, a bobbin coaxial with said spindle, a driving shaft journalled in said frame, a worm wheel secured to said shaft, a worm in mesh with said worm wheel journalled in said frame, means for coupling said spindle in rotation with said worm, a centrifugal frictional clutch including a driving part, a driven part and centrifugal force responsive control means for interconnecting said two parts, means for coupling said driving part in rotation with said spindle, means for coupling said driven part in rotation with said bobbin, means for positively transmitting rotary motion between said bobbin and said centrifugal control means, restarting means for transmitting a portion of the torque of said driving part to said driven part for starting said part into rotation.

6. A spinning spindle mechanism which comprises, in combination, a frame, a spindle rotatably mounted on said frame, a bobbin coaxially carried by said spindle for rotation therewith, a driving shaft journalled in said frame, a worm wheel secured to said shaft, a worm in mesh with said worm wheel journalled in said frame, a centrifugal frictional clutch including a driving part, a driven part and centrifugal force responsive control means for interconnecting said two parts, means for coupling said driving part in rotation with said worm, means for positively coupling said driven part in rotation with said spindle, means for transmitting rotary motion between said bobbin and said centrifugal control means, and restarting means for transmitting a portion of the torque of said driving part to said driven part.

7. A spinning spindle mechanism which comprises, in combination, a frame, a spindle rotatably mounted on said frame, a bobbin coaxial with said spindle, a driving shaft journalled in said frame, a worm wheel secured to said shaft, a worm in mesh with said worm wheel journalled in said frame, means for coupling said spindle in rotation with said worm, a centrifugal frictional clutch including a driving part, a driven part and centrifugal force responsive control means for interconnecting said two parts, means for coupling said driving part in rotation with said spindle, means for coupling said driven part in rotation with said bobbin, means for positively transmitting rotary motion between said bobbin and said centrifugal control means, restarting means for transmitting a portion of the torque of said driving part to said driven part, means for braking said bobbin, and means operatively connected with said braking means for disengaging said restarting means when said braking means are in action.

8. A spinning spindle mechanism which comprises, in combination, a frame, a spindle rotatably mounted on said frame, a bobbin coaxial with said spindle, a driving shaft journalled in said frame, a worm wheel secured to said shaft, a worm in mesh with said worm wheel journalled in said frame, means for coupling said spindle in rotation with said worm, a centrifugal frictional clutch including a driving part in the form of a cup-shaped member, a driven part in the form a sleeve coaxially disposed inside said member and centrifugal force responsive control means for interconnecting said two parts constituted by masses movable radially with respect to said sleeve but fixed with respect thereto in the axial direction, means for coupling said driving part in rotation with said worm, means for coupling said driven part in rotation with said bobbin, means for positively transmitting rotary motion between said bobbin and said centrifugal control means, the under edges of said masses and the bottom of said cup-shaped member being adapted to cooperate together to form restarting means for transmitting a portion of the torque of said driving part to said driven part, and means for simultaneously braking said bobbin and lifting it whereby said restarting means are disengaged when said braking means are in action.

9. A spinning spindle mechanism which comprises, in combination, a frame, a spindle rotatably mounted on said frame, a bobbin coaxially carried by said spindle for rotation therewith, a driving shaft journalled in said frame, a worm wheel secured to said shaft, a worm in mesh with said worm wheel journalled in said frame, a centrifugal frictional clutch including a driving part, a driven part and centrifugal force responsive control means for interconnecting said two parts, means for coupling said driving part in rotation with said worm, means for coupling said driven part in rotation with said spindle, means for positively transmitting rotary motion between said bobbin and said centrifugal control means, and spring means for urging said centrifugal control means into contact with the driving part even when the driven part is stopped so as to transmit a portion of the torque of said driving shaft to said driven part.

10. A spinning spindle mechanism which comprises, in combination, a frame, a spindle rotatably mounted on said frame, a bobbin coaxially carried by said spindle for rotation therewith, a driving shaft journalled in said frame, a worm wheel secured to said shaft, a worm in mesh with said worm wheel journalled in said frame, a cylindrical sleeve coupled in rotation with said worm coaxially surrounding the lower end of said spindle, two centrifugal masses each in the form of a substantially semi-cylindrical element fitting between said sleeve and said spindle lower end, the lower portions of said elements being in the form of transverse walls extending inwardly so that their inner faces are located at a distance from each other on either side of the axis of said sleeve, the lower end of said spindle including bevelled faces and, below said faces, and a screwdriver portion adapted to engage into the space between said inner faces of the centrifugal elements.

LOUIS BIRKIGT.

REFERENCES CITED

The following references are of record in the file of this patent:

UNITED STATES PATENTS

| Number | Name | Date |
|---|---|---|
| 1,317,302 | Lyth | Sept. 30, 1919 |
| 1,772,315 | Kanter | Aug. 5, 1930 |
| 1,786,348 | Keyser | Dec. 23, 1930 |
| 1,798,817 | Stone | Mar. 31, 1931 |